United States Patent Office 3,035,091
Patented May 15, 1962

3,035,091
CARBOXYLATED BISPHENOL COMPOUNDS
James C. Wygant, Dayton, Ohio, assignor to Monsanto Chemical Company, St. Louis, Mo., a corporation of Delaware
No Drawing. Filed Dec. 7, 1959, Ser. No. 857,510
1 Claim. (Cl. 260—520)

This invention relates to a group of multifunctional stabilized bisphenol compounds. More specifically, this invention relates to a group of bis(3-carboxy-4-hydroxyphenyl)hydrocarbon compounds, their salts, and their esters.

The bis(3-carboxy-4-hydroxyphenyl)hydrocarbon compounds of the present invention, which are believed to be new chemical compounds, are solid in nature and are represented by the formula:

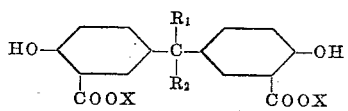

wherein $R_1$ and $R_2$ are selected from the group consisting of hydrogen, hydrocarbyl radicals which are free from aliphatic unsaturation and have from 1 to 9 carbon atoms, so that $R_1$ and $R_2$ represent a total of at least 1 but not more than 9 carbon atoms, and when $R_1$ and $R_2$ are taken together they complete a cycloalkylidene ring having from 5 to 6 carbon atoms, and X represents hydrogen, a salt forming cation, or a hydrocarbon radical which has from 1 to 8 carbon atoms.

In general the above compounds can be prepared by treating bisphenol compounds having $R_1$ and $R_2$ as above defined with carbon dioxide under condition of elevated temperature and pressure. The bisphenol compounds are first prepared by condensing in a known manner two moles of phenol with one mole of a ketone or aldehyde such as acetone, methyl ethyl ketone, 3-n-octanone, benzophenone, actaophenone, cyclohexanone, acetaldehyde, propionaldehyde, butyraldehyde, n-pentaldehyde, 2-ethylhexaldehyde, heptaldehyde, mixed decyl aldehydes, etc. For example, 2,2-bis(4-hydroxyphenyl)butane was prepared as follows.

Catalyst: A mixture of about 2 ml. each of ethyl mercaptan and methyl ethyl ketone in a test tube was treated with 2 drops of concentrated hydrochloric acid. The mixture was allowed to stand overnight.

Phenol (269 g.; 2.86 moles) was charged into a reaction flask and melted. Anhydrous hydrochloric acid was passed in at 45° C. for 25 minutes. Then 0.5 ml. of the catalyst was added. Addition of a solution of 90 ml. (1 mole) of methyl ethyl ketone in 201 g. (2.14 moles) of phenol was begun, while maintaining the hydrochloric acid flow. A reddish solution formed. Addition of the ketone solution required 2 hours 20 minutes. The temperature remained at 39–47° C. After another hour stirring and hydrochloric acid addition were stopped. After standing overnight 100 ml. of toluene was added to the reaction mixture. The mixture was heated under vacuum and the water was azeotroped out, at about 100 mm. When most of the water had been separated, the toluene was distilled out, and then excess phenol was removed at 20–30 mm., up to a pot temperature of about 150° C. The thick residue was poured into 2000 ml. of hot water while stirring, giving an oil. After standing three days, the oil crystallized. It was collected and dried. There was 234 g. (97% yield), melting point 119°–124° C. After recrystallization from benzene there was 211 g., M.P. 126–128° C., of 2,2-bis(4-hydroxyphenyl)butane. Literature M.P. is 124–125° C.

The bisphenol compound, 1,1-bis(4-hydroxyphenyl) cyclohexane was prepared as follows:

Cyclohexanone (0.5 mole) and phenol (2.5 mole) were combined as described above. Separation of solids began almost immediately, and it was necessary to add 100 ml. of benzene during the run in order to maintain stirring. After standing 3 days the reaction mixture, a stiff paste, was poured into 2000 ml. of water. The mixture was boiled to leach out the phenol from the product. After stirring for ½ hour, the mixture was filtered. The product was boiled up with another 2000 ml. of water and filtered again. The nearly white product was vacuum dried. The weight of crude product, M.P. 180–190° C., was 128 g. (96% yield). After recrystallization from benzene, the M.P. was 189–191° C. (lit. 183° C.).

Disodium salts of the bisphenols were prepared by dissolving the bisphenol in aqueous sodium hydroxide, evaporating on a steam bath, and drying to a constant weight at 110° C./20 mm. In the case of the higher melting bisphenols, addition of some ethyl alcohol or methyl alcohol facilitated solution.

Other alkali metal or alkaline earth metal salts of these bisphenol compounds can also be made by neutralizing the compounds with an appropriate base.

The disodium salt of bisphenol A[2,2-bis(4-hydroxyphenyl)propane] was also prepared as a slurry in Dowtherm (Dowtherm is a diphenyl-diphenyl ether mixture). The bisphenol A, sodium hydroxide pellets, Dowtherm, and ethanol mixture was refluxed with stirring until the sodium hydroxide had reacted. The ethanol and water were stripped off, and the slurry heated at 3–5 mm. to reflux the Dowtherm, effecting removal of all water. The resulting slurry contained one mole of the disodium salt of bisphenol A per 600 ml. of Dowtherm.

CARBONATION METHOD

Many of the carbonation experiments were done on small glass trays, in a 300 ml. bath-heated bomb. The reactants after being weighed out and spread on the trays were generally redried prior to loading. Other apparatuses used were a 1.4 liter and a gallon stirred autoclaves and a 500 ml. dasher-agitated autoclave. When slurries were prepared in Dowtherm, this was done in glass apparatus, and the slurry was transferred to the autoclave. Two to four parts of Dowtherm per part of salt was used. After charging, the bombs were flushed 3–4 times with carbon dioxide, and then pressurized to 700–900 p.s.i.g. (cylinder pressure). Recharging during runs was not necessary. After the heating period, the bombs were cooled, vented, and the reactants removed. Dowtherm slurries were rinsed out with benzene. The slurries were filtered and the salts washed with benzene.

The reaction mixtures were dissolved with warming in 4–8 parts of water, the solutions filtered, the filtrates acidified with concentrated hydrochloric acid, and the products collected and washed with water to give the crude products. Further treatment of the crude products varied from run to run, and is described separately below.

Example 1

The crude product obtained in 85% yield from the carbonation of 0.06 mole of the disodium salt of bisphenol A, analyzed as follows:

|  | Found | Anal. Calcd. for $C_{17}H_{16}O_6$ |
|---|---|---|
| Percent C | 63.57 | 64.55 |
| Percent H | 5.32 | 5.10 |
| Neut. Eq | 179 | 158 |

This material melted at 261–266° C. with decomposition. Part of the material (15 g.) was recrystallized from acetic acid containing a little water. This gave 7.8 g.

of purified 2,2-bis(3-carboxy-4-hydroxyphenyl)propane, M.P. 274–278° dec.

Example 2

Carbonation of 0.051 mole of the disodium salt of 1,1-bis(4-hydroxylphenyl)butane resulted in a gummy solid, which, after re-solution in sodium bicarbonate solution and reprecipitation with HCl weighed 13.5 g. (82% yield), melting point 194–217° C. Recrystallization from dilute acetic acid gave 9.9 g., M.P. 206–277°. This material was then recrystallized from acetone-benzene, giving 4.4 g. of purified 1,1-bis(3-carboxy-4-hydroxyphenyl)butane, M.P. 236–239, which analyzed as follows:

|  | Found | Anal. Calcd. for $C_{18}H_{18}O_6$ |
| --- | --- | --- |
| Percent C | 65.86 | 65.44 |
| Percent H | 6.27 | 5.49 |
| Neut Eq | 167, 168 | 165 |

Example 3

Carbonation of 0.05 mole of the disodium salt of 2,2-bis(4-hydroxyphenyl)butane produced 14.5 g. (88% yield) of crude acid, decomposed 250–254° C.

After recrystallization from the dilute acetic acid and from acetonitrile the 2,2-bis(3-carboxy-4-hydroxyphenyl)butane product melted at 270–272° C., dec., and analyzed as follows:

|  | Found | Anal. Calcd. for $C_{18}H_{18}O_6$ |
| --- | --- | --- |
| Percent C | 65.45 | 65.44 |
| Percent H | 5.97 | 5.49 |
| Neut. Eq | 168 | 165 |

Example 4

Carbonation of 0.052 mole of the disodium salt of 1,1-bis(4-hydroxyphenyl)cyclohexane gave 9.8 g. of what appeared to be a mixture of the mono- and dicarboxylic acids. It melted at 167–184° C. This material was redissolved in sodium bicarbonate and reprecipitated. It then melted at 169–183° C. It was recrystallized twice from water-ethanol mixture giving a mixture of 1,1-bis(3-carboxy-4-hydroxyphenyl)cyclohexane and 1-(3-carboxy-4-hydroxylphenyl)-1-(4-hydroxyphenyl)-cyclohexane and analyzed as follows:

|  | Found | Anal. Calcd. for $C_{20}H_{20}O_6$ (di) | $C_{19}H_{20}O_4$ (mono) |
| --- | --- | --- | --- |
| Percent C | 71.65 | 67.40 | 73.06 |
| Percent H | 6.51 | 5.66 | 6.45 |
| Neut. Eq | 225–28 | 178 | 312 |

Example 5

The crude product obtained by carbonating the disodium salt of 2,2-bis(4-hydroxyphenyl)octane was a black oil which did not crystallize. This oil was partly dissolved in sodium bicarbonate. Acidification again gave a black oil. On standing, the material solidified (M.P. 67–79° C.). Solution in benzene and precipitation with hexane gave a small amount of dark material, M.P. 70–90° C. Further purification gave a product having a M.P. of 91° to 94° C.

The compounds of this invention are most often prepared in the alkali metal salt form, that is, the lithium, sodium, potassium, rubidium, cesium, as above. If other metal salt forms of these compounds are desired, such compounds can be prepared by simply treating the alkali metal salt or the free carboxyl form of the compound with a base, a basic salt solution or preferably a soluble neutral salt of the heavier metal to replace the alkali metal or the hydrogen atom from the carboxyl group. For example, if the disodium salt of 2,2-bis(3-carboxy-4-hydroxyphenyl)propane is treated with a solution of a salt such as calcium chloride, the calcium salt of 2,2-bis(3-carboxy-4-hydroxyphenyl)propane is formed. Treatment of the sodium salt or the free carboxyl form of these compounds with a soluble copper salt such as copper acetate or copper nitrate results in the formation of the copper salt of these compounds. Although the heavier metal salts can be prepared from the free carboxyl form of the compounds it is preferred to treat the disodium form of the compounds with the heavy metal salt in solution for reasons of convenience and ease of manipulation. Examples of other cationic materials that may be used to form the salts of these compounds are the alkaline earth metal salts, i.e., the calcium, strontium and barium soluble salts such as the nitrate, chloride, acetate, sulfate, phosphate, etc., as well as the hydroxides thereof, soluble magnesium salts such as magnesium chloride, nitrate, acetate, sulfate, bicarbonate, bisulfate, etc. and magnesium hydroxides, as well as zinc, aluminum, mercury, cobalt, nickel, and iron soluble metal salts, ammonium hydroxide, quaternary ammonium hydroxides, etc.

Example 6

A solution of 10 g. (0.316 mole) of bisphenol A-dicarboxylic acid, (2,2-bis(3-carboxy-4-hydroxyphenyl)-propane) and 3.5 g. of sodium carbonate in 100 ml. of water was prepared and filtered. A solution of 6.3 g. (0.316 mole) of cupric acetate having 1 water of hydration in 100 ml. of water was prepared, heated and filtered. The warm solutions were combined, producing an olive-green precipitate. The precipitate was filtered and washed with water. The olive drab solid was dried at 100° C./20 mm. There was thus obtained 8.2 g. of cupric salt of 2,2-bis(3-carboxy-4-hydroxyphenyl)butane which remained unmelted at 300° C.

Preparation of esters of the carboxy bisphenol compounds of this invention is accomplished by standard methods. The acid, alcohol and catalyst mixture, and solvent (if used) is refluxed under a Dean-Stark trap for collecting water. After reaction, the reaction mixture is washed with water, sodium hydroxide or sodium bicarbonate, and again with water. The ester is isolated either by vacuum distilling, or by steaming out the unreacted alcohol. Vacuum steaming is used for removing the higher boiling alcohols. After steaming, the ester is dried by heating at 100° C./20 mm., and filtered.

Example 7

2,2-bis(3-carbobutoxy-4-hydroxyphenyl)propane (B.P. 216°C./0.6 mm.), $n_D^{25}$ 1.5306 was prepared by reacting 31.6 g. (0.1 mole) of 2,2-bis(3-carboxy-4-hydroxyphenyl)propane with 59.2 g. (0.8 mole) of n-butanol in 50 ml. of toluene, using 2.0 g. of sulfuric acid as a catalyst, over a period of 15 hours at a temperature of 113° C. Analysis of the product is as follows:

|  | Found | Anal. Calcd. for $C_{25}H_{32}O_6$ |
| --- | --- | --- |
| Percent C | 69.93 | 70.07 |
| Percent H | 7.42 | 7.53 |
| Saponification Eq | 220, 221 | 214 |

The esters of this invention are of particular interest as plasticizer materials.

The preferred compounds of this invention are those having alkyl or simple aryl radicals ($R_1$ and $R_2$) attached to the central or bridge carbon, of which 2,2-bis(3-carboxy-4-hydroxyphenyl)propane, its salts and its esters are examples. Having hydrocarbyl radicals as defined above so attached, gives the whole compound greater thermal stability and greater resistance to oxidative degradation than those compounds having only hydrogen atoms in the $R_1$ and $R_2$ position. Certain of these compounds, i.e., those in which at least one of $R_1$ and $R_2$ are hydrocarbyl radicals rather than hydrogen, exhibit properties which are more valuable in certain applications than those derived from the higher melting compounds in which $R_1$ and $R_2$ are hydrogen. Polyester and polyamide resins, derived from these compounds, have lower softening points than those made from compounds wherein $R_1$ and $R_2$ are hydrogen. Plasticizers derived from these compounds wherein $R_1$ and $R_2$ are hydrocarbyl radicals have lower melting points and impart better flex characteristics than those in which $R_1$ and $R_2$ are hydrogen. For example, the literature (Journal of Applied Chemistry, vol. 3, November 1953, p. 492) reports that the bis(3-carboxy-4-hydroxyphenyl)-methane has a melting point of 269°–271° C. By comparison, 1,1-bis(3-carboxy-4-hydroxyphenyl)butane (Example 2 of my specification) melts at 236–239° C., some thirty degrees lower than the bis(3-carboxy-4-hydroxyphenyl)methane. Where the R groups are longer e.g., from 6–9 carbon atoms, much lower melting points are observed. These differences are indicative of the decrease in softening and melting points of polyesters and plasticizers derived from these bridge-substituted materials. The technological reason for this effect is not definitely known. It is possibly due to the decrease in crystallinity resulting from the presence of a bulky substituent on the bridge carbon which substituent interferes with the alignment of molecules or chains into close packed arrays. However, I do not wish to be restricted to this theoretical explanation of the properties observed in these compounds.

Examples of compounds of this invention prepared by carbonating ketone-phenol condensation products as above are:

2,2-bis(3-carboxy-4-hydroxyphenyl)-n-pentane,
4,4-bis(3-carboxy-4-hydroxyphenyl)-n-heptane,
1,1-bis(3-carboxy-4-hydroxyphenyl)-1-phenylethane,
Dipotassium salt of bis(3-carboxy-4-hydroxyphenyl)-diphenylmethane,
Dicuprous salt of 2,2-bis(3-carboxy-4-hydroxyphenyl)butane,
Zinc salt of 4,4-bis(3-carboxy-4-hydroxyphenyl)octane,
2,2-bis(3-carboethoxy-4-hydroxyphenyl)propane,
3,3-bis(3-carbophenoxy-4-hydroxyphenyl)-n-hexane,
1,1-bis(3-carbo(2-ethylhexyloxy)-4-hydroxyphenyl)cyclohexane, and
1,1-bis(3-carbopropargyloxy-4-hydroxyphenyl)cyclopentane.

Examples of compounds of this invention prepared by carbonating aldehyde-phenol condensation products as above are:

1,1-bis(3-carboxy-4-hydroxyphenyl)ethane,
α,α-bis(3-carboxy-4-hydroxyphenyl)toluene,
1,1-bis(3-carboxy-4-hydroxyphenyl)heptane,
Calcium salt of 1,1-bis(3-carboxy-4-hydroxyphenyl)propane,
Dilithium salt of 1-furyl-1,1-bis(3-carboxy-4-hydroxyphenyl)methane,
Ferrous salt of 1,1-bis(3-carboxy-4-hydroxyphenyl)butane,
1,1-bis(3-carbopropoxy-4-hydroxyphenyl)hexane,
1,1-bis(3-carbo(p-methylphenoxy)-4-hydroxy)propane,
1,1-bis(3-carbobenzyloxy-4-hydroxyphenyl)ethane, and
1,1-bis(3-carboallyloxy-4-hydroxyphenyl)octane.

Because of their multifunctionality, these compounds have wide utility. They have a carboxyl group in each ring of the molecule which makes them useful as intermediates in preparing polyester and polyamide resins. They have a hydroxyl group at each end of the molecule which makes them valuable epoxy resin intermediates. Since they have a combination of a hydroxyl group and a carboxyl group on the ring portions of the molecule, they have pharmaceutical uses, analogous to those of salicylic acid, used in making aspirin. Their having a carboxyl group at each end of the molecule makes them useful as chelating agents. As mentioned above, these compounds in their ester form are valuable as plasticizers, e.g., in polyvinyl chloride resins.

I claim:

Disodium salt of 1,1-bis(3-carboxy-4-hydroxyphenyl)-cyclohexane.

References Cited in the file of this patent
UNITED STATES PATENTS 2,374,949   Niederl _____ May 1, 1945